United States Patent
McCallum (10) Patent No.: US 8,863,080 B2
(45) Date of Patent: Oct. 14, 2014

(54) MAINTAINING A POINTER'S TYPE

(75) Inventor: Nathaniel McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 365 days.

(21) Appl. No.: 13/306,935

(22) Filed: Nov. 29, 2011

(65) Prior Publication Data

US 2013/0138895 A1 May 30, 2013

(51) Int. Cl.
*G06F 9/45* (2006.01)

(52) U.S. Cl.
USPC .......................................................... 717/115

(58) Field of Classification Search
CPC .............. G06F 8/437; G06F 9/45529
USPC ............................................................ 717/115
See application file for complete search history.

(56) References Cited

U.S. PATENT DOCUMENTS

| | | | |
|---|---|---|---|
| 6,529,948 B1 * | 3/2003 | Bowman-Amuah | 709/217 |
| 8,539,463 B2 * | 9/2013 | De et al. | 717/146 |
| 2013/0145216 A1 * | 6/2013 | Eggers et al. | 714/38.1 |

OTHER PUBLICATIONS

McCallum, Nathaniel; On the Out-of-Browser JavaScript Ecosystem; Dec. 6, 2010; 4 pages; <http://nathaniel.themccallums.org/2010/12/06/on-the-out-of-browser-javascript-ecosystem/>.

* cited by examiner

*Primary Examiner* — John Chavis
(74) *Attorney, Agent, or Firm* — Lowenstein Sandler LLP (57) ABSTRACT

A processing device implements a sandbox that provides an isolated execution environment, a memory structure. The processing device generates a pointer to a data item, the pointer having a type. The processing device generates a key for the pointer based on the type of the pointer. The processing device designates a name for the pointer based on the key. The processing device then inserts the pointer having the designated name into the memory structure, causing the pointer to become a private pointer.

20 Claims, 5 Drawing Sheets

MAINTAINING A POINTER'S TYPE

FIELD OF INVENTION

Embodiments of the invention relate to pointers used by a scripting engine and, more particularly, to maintaining a pointer's type by a scripting engine or meta-engine.

BACKGROUND OF THE INVENTION

JavaScript is a scripting language that runs applications (e.g., programs) inside of a sandbox. The sandbox is a security mechanism for separating running applications, and provides an isolated execution environment for the applications. There are numerous available JavaScript engines, each of which interprets and executes JavaScript (or ECMAScript) in a slightly different manner. Examples of such JavaScript engines include Spider Monkey®, V8® and Nitro®.

Applications that run inside of the JavaScript sandbox frequently need to store data or access data outside of the sandbox. For example, such applications may store an object's state in native code that underlies the sandbox. To enable an application inside of the sandbox to access data outside of the sandbox, the JavaScript engines provide functions that generate pointers to the data. The functions place the pointers into JavaScript objects that are placed inside of the JavaScript sandbox. However, with conventional JavaScript engines, the pointers lose their type information when the pointers are placed in the JavaScript object. These JavaScript engines do not provide any mechanism for automatically determining the types that private pointers should have, or for automatically assigning pointer types to private pointers. When the type information is lost, there is typically no guarantee when a pointer is later pulled outside of the sandbox that it is the same pointer that was placed into the sandbox. This can have negative effects with regards to security. To address the loss of type, application developers currently typically need to add code to perform type checking to the applications. This can be burdensome, and has a high error rate. Additionally, programmers may fail to add type checking to their code, which may introduce security weaknesses.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and systems for generating private pointers that preserve type information are described herein. In one embodiment, a processing device implements a sandbox that provides an isolated execution environment. For example, the processing device may execute a scripting engine that uses a sandbox, such as a JavaScript engine or a JavaScript meta-engine. The processing device generates a pointer to a data item, the pointer having a type. The processing device generates a key for the pointer based on the type of the pointer. The processing device designates a name for the pointer based on the key. In one embodiment, the processing device translates the pointer's type into a string, and uses the string to name the pointer. The processing device inserts the pointer having the designated name into a memory structure, potentially causing the pointer to lose its type and become a private pointer. The memory structure may then be placed into the sandbox. When the memory structure is removed from the sandbox, the processing device may retrieve the pointer using the pointer's name, and may then automatically convert the pointer from a typeless pointer into a typed pointer since the pointer's name identifies the type that the pointer should have.

Embodiments of the present invention provide increased security over conventional scripting engines by preserving the type information for pointers such as private pointers. When the type information for a private pointer is preserved, an application (or function of an application) that retrieves the private pointer from a memory structure (e.g., a JavaScript object) may determine to a high degree of certainty that the retrieved private pointer is an expected pointer. This determination may be made without performing type checking on the pointer, thus reducing a burden on software developers and improving security.

Figure 1:
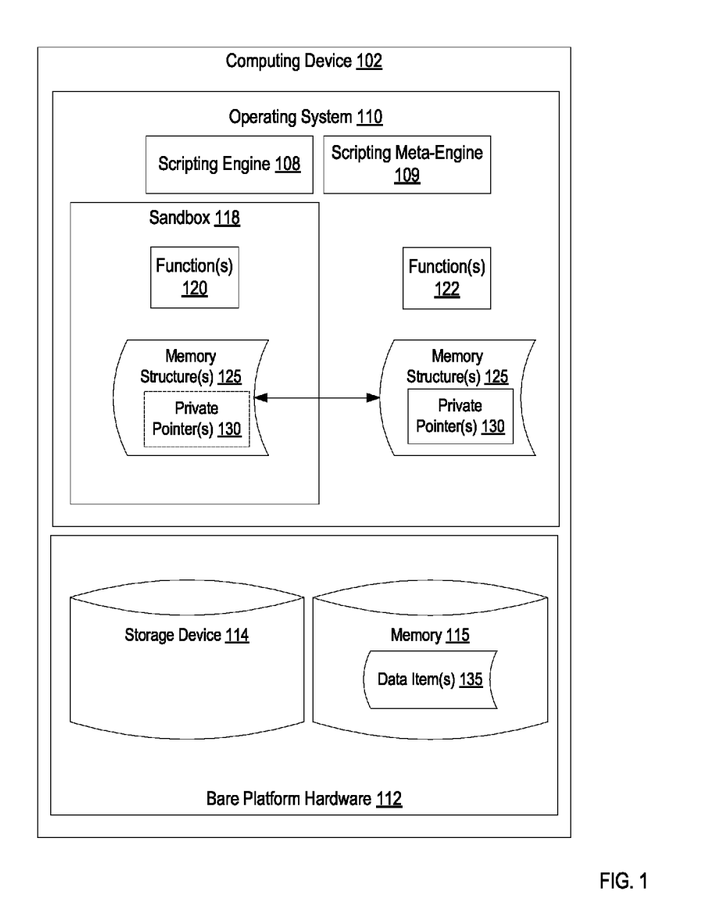
FIG. 1 illustrates a computing device, in accordance with one embodiment of the present invention.

FIG. 1 illustrates a computing device 102, in accordance with one embodiment of the present invention. The computing device 102 includes bare platform hardware 112 and an operating system (OS) 110 that operates on the bare platform hardware. The platform hardware 112 can be of a personal computer (PC), server computer, mainframe, handheld device, portable computer, set-top box, or any other computing system. The platform hardware 112 can include a processor (not shown), memory 115, input/output (I/O) devices (not shown), a storage device 114, etc. The storage device 114 may be a non-volatile memory such as a hard disk drive, tape drive, optical disc drive, etc. The memory 115 may be a volatile memory such as random access memory (RAM).

The operating system (OS) 110 provides an interface between bare platform hardware 112 and software that runs on the OS 110 (e.g., sandbox 118, scripting engine 108, functions 120, 122, etc.). The operating system 110 includes resources (e.g., data item 135) that can be accessed by software running on the operating system 110. However, such access to these resources by untrusted code (e.g., by JavaScript code received from a server machine) can be a security risk. Accordingly, operating system 110 includes a sandbox 118 that isolates the execution of applications and/or individual functions within the sandbox 118. Additionally, operating system 110 may include a scripting engine 108 that implements the sandbox 118.

In one embodiment, operating system 110 include a scripting meta-engine 109. The scripting meta-engine 109 may act as an interface between scripted functions and the scripting engine 108. For example, scripting engine 108 may a conventional JavaScript scripting engine such as Spider Monkey or V8. However, each of these scripting engines 108 has different functions, commands, interfaces, etc. Rather than coding functions separately for each of the different scripting engines to ensure compatibility, a developer may code functions for the scripting meta-engine 109. The scripting meta-engine 109 may then interpret the functions and pass on commands and arguments to scripting engine 108, regardless of the specific implementation of the scripting engine 108.

In one embodiment, the scripting engine 108, scripting meta-engine 109 and/or sandbox 118 are components of a web browser. Alternatively, the scripting engine 108, scripting meta-engine 109 and/or sandbox 118 may be external to a web browser. For example, they may be components of a server-side JavaScript environment such as Node.js.

Functions 120 may execute within the sandbox 118. The functions 120 may be standalone functions, functions of a plugin or application extension, functions for an application, or other types of functions. In one embodiment, the functions 120 are scripted functions written in a language of the scripting engine 108. For example, the functions 120 may be JavaScript functions. The functions 120 typically have access only to data, functions, objects or other memory structures 125 that are placed inside of the sandbox 118. Accordingly, functions 120 typically are unable to execute instructions or reference any memory addresses outside of the sandbox 118. This minimizes a security risk posed by the functions 120 by preventing the functions 120 from opening files, infecting applications, or otherwise affecting anything outside of the sandbox 118.

Functions 120 may need to store data or access data such as a data item 135 outside of the sandbox 118. However, functions 120 typically have no information about resources (e.g., a data item 135) external to the sandbox 118. To enable functions 120 to access a data item 135 in memory, operating system 110 may include native functions 122 for the handling of data items external to the sandbox 118. Functions 122 may be standalone function, functions of a plugin or application extension, plugins of an application, or other types of functions. Functions 122 may load data items into memory 115, write to the data items or perform other operations with regards to resources outside of sandbox 118. These operations may be performed based on requests received from functions 120.

Functions 122 may use memory structures 125 to communicate with functions 120 regarding specific in memory data items 135 to perform operations on. Each memory structure 125 may be an object (e.g., a JavaScript object) that represents a data item 135 (or multiple data items) in memory 115. Each memory structure 125 may contain a private pointer (or pointers) 130 to the in memory data item (or data items) 135 that it represents. A private pointer 130 is any pointer that is placed into a memory structure 125 that is undetectable from particular environments (e.g., from inside of a sandbox 118). The private pointer 130 may be undetectable, for example, from within the sandbox 118, and so is referred to as a private pointer. Private pointer 130 is illustrated with dashed lines inside of sandbox 118 to show that it is inaccessible and undetectable from within the sandbox 118. Functions 120 running within sandbox 118 may attempt to perform operations on the memory structures 125. In response, a native function 122 running outside of the sandbox 118 may use the private pointers 130 stored within those memory structures 125 to perform operations on the data items 135 represented by the memory structures 125.

An application (e.g., a web browser) may use the scripting engine 108 or scripting meta-engine 109 to generate a memory structure 125 for a particular data item 135. The scripting engine 108 or meta-engine 109 may then generate a pointer for the memory structure 125. The generated pointer has a particular type, which may be specified by scripting engine 108 or meta-engine 109. The type of the pointer indicates a type of the data item to which the pointer is pointing. Examples of different pointer types include arrays, database state, iterators and file handles. In one embodiment, the scripting engine 108 or meta-engine 109 generates a key based on the type of the pointer, and names the pointer based on the key. Once the pointer is generated, scripting engine 108 or meta-engine 109 inserts the pointer into the memory structure 125, causing the pointer to become a private pointer. The act of placing the pointer into the memory structure 125 may cause the pointer to become a void (typeless) pointer. However, the type information for the pointer can be determined based on the pointer's name in one embodiment. The memory structure 125 may then be placed inside of the sandbox 118 for use by functions 120.

In one example, function 120 may be a JavaScript application that has been downloaded to the computing device 102 from an untrusted remote server. The function 120 may be configured, for example, to set a cookie. To enable the function 120 (which does not have access to any files) to set cookies, scripting engine 108 or meta-engine 109 may cause a cookie file to be loaded into memory 115, in which case the cookie file would return a pointer to a location in memory that it was loaded to. The scripting engine 108 or meta-engine 109 could then generate a pointer based on the returned pointer, generate a memory structure representing the cookie file, and insert the pointer into the memory structure, causing the pointer to become a private pointer. Once the memory structure 125 representing the cookie file is placed into the sandbox 118, the function 120 would be able to read and write to the cookie file.

To set a cookie using the memory structure 125, the function 125 can attempt to perform a set cookie operation. This may invoke a native function 122 operating outside of sandbox. The native function 122 may receive as an argument a native code representation to the memory structure 125 in the sandbox 118. The function 122 may then retrieve the private pointer 130 from the memory structure. In one embodiment, the function 122 has information on the type of pointer that should be in the memory structure 125. For example, the pointer type may be provided to the function 122 as an argument. Function 122 may convert this known type into a key (and ultimately a pointer name), and may request that a private pointer having a specified pointer name be returned from the memory structure 125. If the requested pointer is returned, then there is a high degree of certainty that the returned pointer is the same private pointer that is included in the memory structure 125. The returned private pointer is a typeless pointer. However, the name of the typeless pointer indicates a type that the pointer should have. Therefore, after the typeless pointer is returned, the function 122 may automatically convert (e.g., cast) the typeless pointer into a typed pointer with the appropriate type. The function may then perform a write operation on the cookie file at the location in memory specified by the returned pointer.

Figure 2:
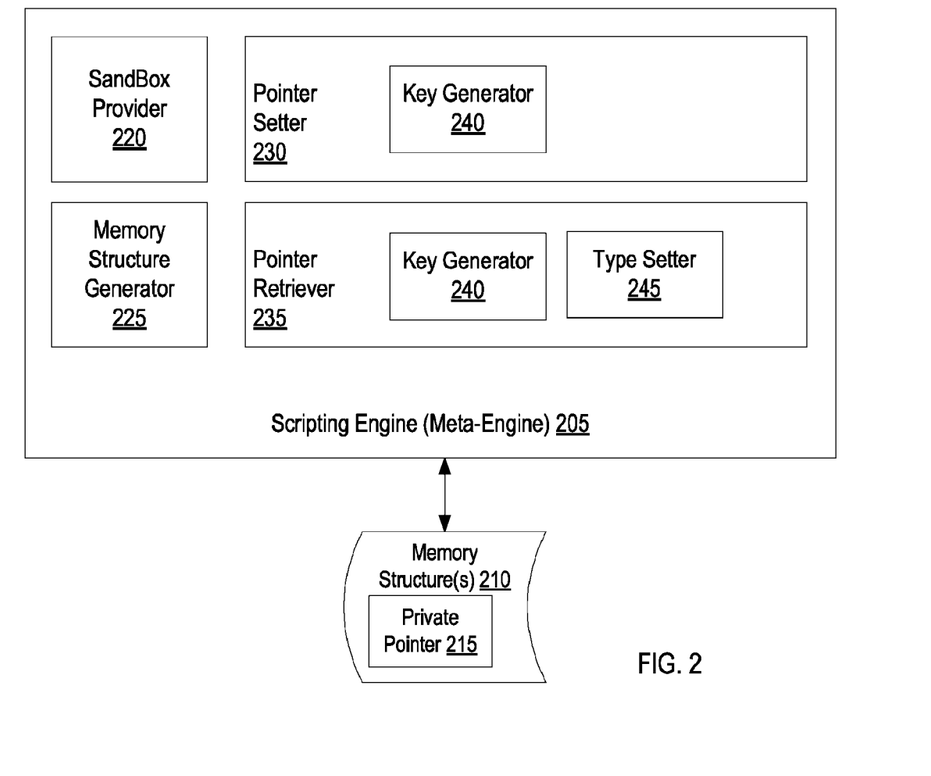
FIG. 2 is a block diagram of one embodiment of a scripting engine or meta-engine.

FIG. 2 is a block diagram of one embodiment of a scripting engine (or meta-engine) 205. The scripting engine 205 may correspond to scripting engine 108 or scripting meta-engine 109 of FIG. 1. In one embodiment, the scripting engine 205 includes a sandbox provider 220, a memory structure generator 225, a pointer setter 230 and a pointer retriever 235. In alternative embodiments, some or all of these modules may be combined into a single module, or individual modules may be separated into multiple modules. Additionally, each of these modules may be invoked by functions and applications running in an operating system on which the scripting engine 205 is installed.

The sandbox provider 220 is responsible for maintaining a sandbox for the execution of untrusted software. Memory structure generator 225 may generate memory structures 210 and/or place the memory structures 210 into the sandbox maintained by sandbox provider 220. Pointer setter 230 generates pointers to data items, and inserts the pointers into the memory structures 210. In one embodiment, pointer setter 230 sets the pointer in the memory structure 210 prior to the memory structure 210 being placed into the sandbox. Alternatively, pointer setter 230 may set the pointer 215 in the memory structure 210 after the memory structure is placed into the sandbox.

As discussed above, each pointer has a type when it is first generated. Pointer setter 230 includes a key generator 240 that generates a key from the pointer's type. Key generator 240 may generate keys in a deterministic manner such that the same input will always generate the same key. For example, the pointer type of an SQL connection may always be converted into a key of "24." In one embodiment, key generator 240 converts the pointer's type into a string. For example, the key generator 240 may convert the above mentioned SQL connection type into the string "SQL_connection." In a further embodiment, the key generator 240 uses the C programming preprocessing function of "stringification" to convert the private pointer's type into a string. In another embodiment, key generator 240 converts the pointer's type into a hash using a hashing function (e.g., MD5).

Once key generator 240 has generated the key for the pointer, pointer setter 230 names the pointer based on the key. In one embodiment, pointer setter 230 uses the key as the name for the pointer. In another embodiment, pointer setter 230 derives a name for the pointer based on the key. For example, pointer setter 230 may use a first 10 characters or last 6 characters from the key for the pointer's name.

Pointer retriever 235 retrieves pointers 215 (which may be private pointers) from memory structures 210 that have been placed into the sandbox. Pointer retriever 235 may also retrieve private pointers 215 that were not placed into the sandbox. Pointer retriever 235 is typically invoked by a function in response to the function receiving a request to perform an operation on a memory structure that contains a private pointer. Pointer retriever 235 includes key generator 240 and a type setter 245.

Pointer retriever 235 may be invoked with an argument identifying a pointer type that is to be retrieved. Alternatively, a pointer type may otherwise be specified to pointer retriever 235. In response, key generator 240 generates a key based on identified or specified pointer type. Key generator 240 generates the key using the same technique as described above with reference to pointer setter 230. Key generator 240 then determines a pointer name based on the key, and attempts to retrieve a pointer having the determined pointer name from the memory structure 210. If the pointer having the specified name is successfully returned, then there is a high degree of certainty that the returned pointer is the correct pointer.

Once the pointer is retrieved, type setter 245 automatically converts the retrieved pointer from a typeless (void) pointer into a typed pointer. Type setter 245 can perform this operation automatically because the name of the pointer indicates a pointer type that the pointer should have. Once this name is matched to a pointer name derived from a specified pointer type, it is confirmed that the retrieved pointer should have that pointer type. The conversion of the typeless pointer to a typed pointer is commonly referred to as performing a cast to the original type. This conversion can be performed automatically by the pointer retriever 235 without requiring an application developer to manually program an application to perform type casting. This can reduce a programming burden imposed on application developers, and can improve an accuracy of the type cast that is ultimately performed.

Figure 3:
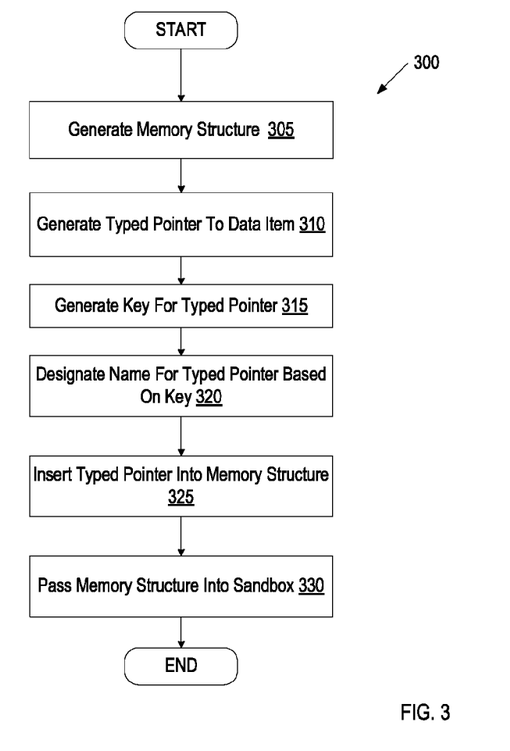
FIG. 3 is a flow diagram of one embodiment for a method of generating a private pointer for use inside of a sandbox.

FIG. 3 is a flow diagram of one embodiment for a method 300 of generating a private pointer for use inside of a sandbox. The method 300 is performed by processing logic that may comprise hardware (circuitry, dedicated logic, etc.), software (such as is run on a general purpose computer system or a dedicated machine), or a combination of both. Method 300 may be performed by a scripting engine or a scripting meta-engine, such as those discussed with reference to the preceding figures.

Referring to FIG. 3, at block 305 processing logic provides a memory structure (e.g. an object such as a JavaScript object). The memory structure represents an in memory data item. At block 310, processing logic generates a typed pointer that points to the data item represented by the memory structure. At block 315, processing logic generates a key for the typed pointer. The key may be generated by converting the pointer type for the typed pointer into a string, or by performing some other deterministic function (e.g., a hash function) using the pointer type as an input. At block 320, processing logic designates a name for the typed pointer based on the key that was generated from the pointers type. In one embodiment, the key is simply used as the pointer's name.

At block 325, processing logic inserts the typed pointer into the memory structure, causing the pointer to become a private pointer (and typically causing loss of type information). At block 330, processing logic passes the memory structure into a sandbox. Alternatively, processing logic may store the memory structure outside of any sandbox. Functions within the sandbox can then perform operations on the memory structure to cause related operations to be performed on data items that are stored in memory outside of the sandbox. However, the private pointer within the memory structure is not accessible or viewable from within the sandbox. This prevents functions within the sandbox from performing operations other than strictly defined operations on resources outside of the sandbox.

Figure 4:
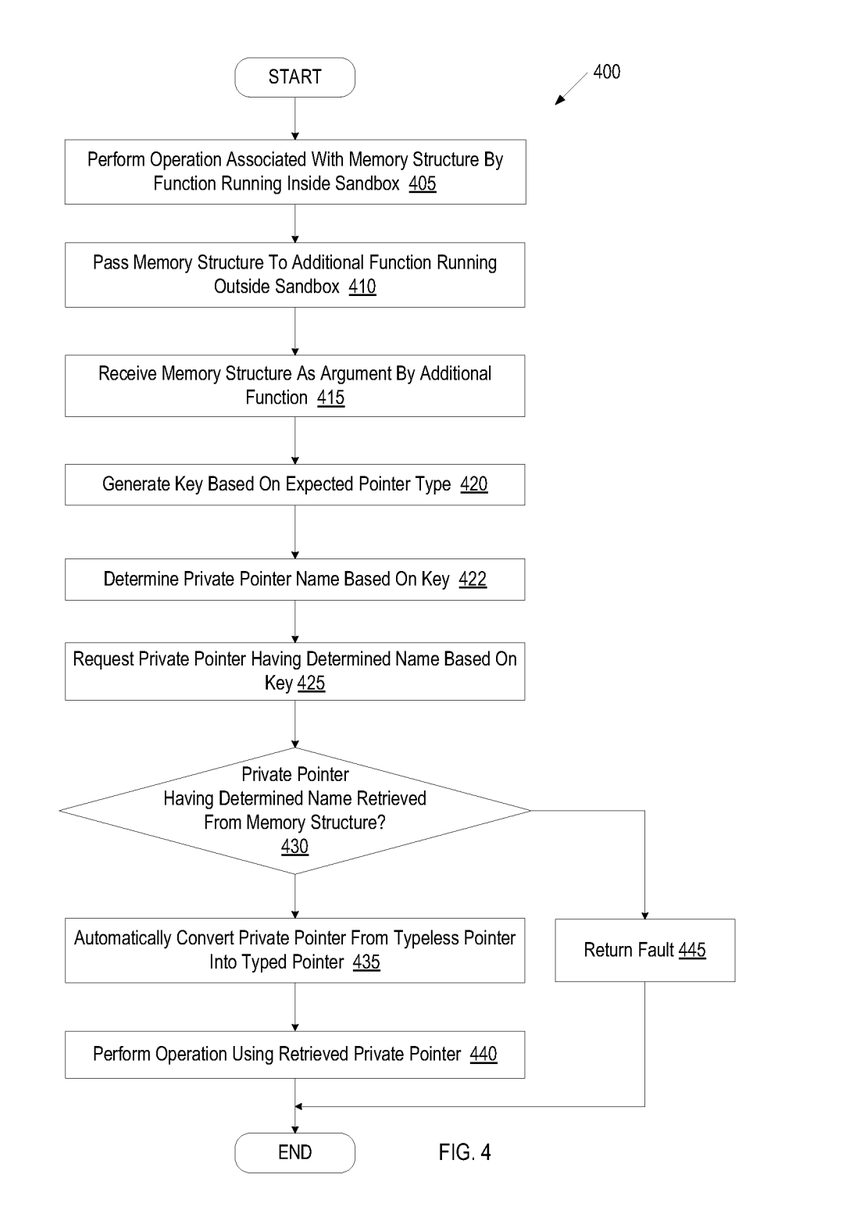
FIG. 4 is a flow diagram of one embodiment for a method of retrieving a private pointer from a sandbox.

FIG. 4 is a flow diagram of one embodiment for a method 400 of retrieving a private pointer (e.g., from a sandbox). The method 400 is performed by processing logic that may comprise hardware (circuitry, dedicated logic, etc.), software (such as is run on a general purpose computer system or a dedicated machine), or a combination of both. In one embodiment, method 400 is performed by a scripting engine or a scripting meta-engine, such as those discussed with reference to the preceding figures.

Referring to FIG. 4, at block 405 a function running inside of a sandbox performs an operation associated with a memory structure. For example, the function may perform an operation to read a cookie or to set a cookie. At block 410, processing logic passes the memory structure to an additional function running outside of the sandbox. The function running outside of the sandbox may be a native function that has access to system resources not available from within the sandbox. At block 415, the function running outside of the sandbox receives the memory structure as an argument.

At block 420, processing logic generates a key for an expected pointer type for the pointer contained inside of the memory structure. The expected pointer type may be specified to the processing logic (e.g., by the function running inside the sandbox or by a function running outside of the sandbox). The expected pointer type may be received as an argument. At block 420, processing logic generates a key based on the expected pointer type. In one embodiment, processing logic converts the pointer type into a string. In another embodiment, processing logic uses the pointer type as an input for a hash function. Other deterministic key generating algorithms may also be used. The key generation algorithm should be a same key generation algorithm that was used to generate a key for the private pointer contained in the memory structure. At block 422, processing logic determines a pointer name based on the key. In one embodiment, processing logic uses the entire key as the pointer name. Alternatively, processing logic may use a portion of the key as the pointer name.

At block 425, processing logic requests a pointer having the determined pointer name. At block 430, processing logic determines whether a pointer having the determined name was successfully retrieved. If the pointer was successfully retrieved, the method continues to block 435. Otherwise, the method proceeds to block 445, and a fault is returned.

At block 435, processing logic automatically converts the pointer from a typeless pointer into a typed pointer. The successful retrieval of the pointer at block 430 indicates that the pointer should have the expected pointer type. However, pointers retrieved from memory structures within a sandbox are typically private pointers that have no type. Accordingly, processing logic assigns the expected pointer type to the retrieved pointer. At block 440, processing logic then performs an operation using the retrieved pointer. For example, processing logic may read from or write to a memory location identified by the pointer. The method then ends.

Figure 5:
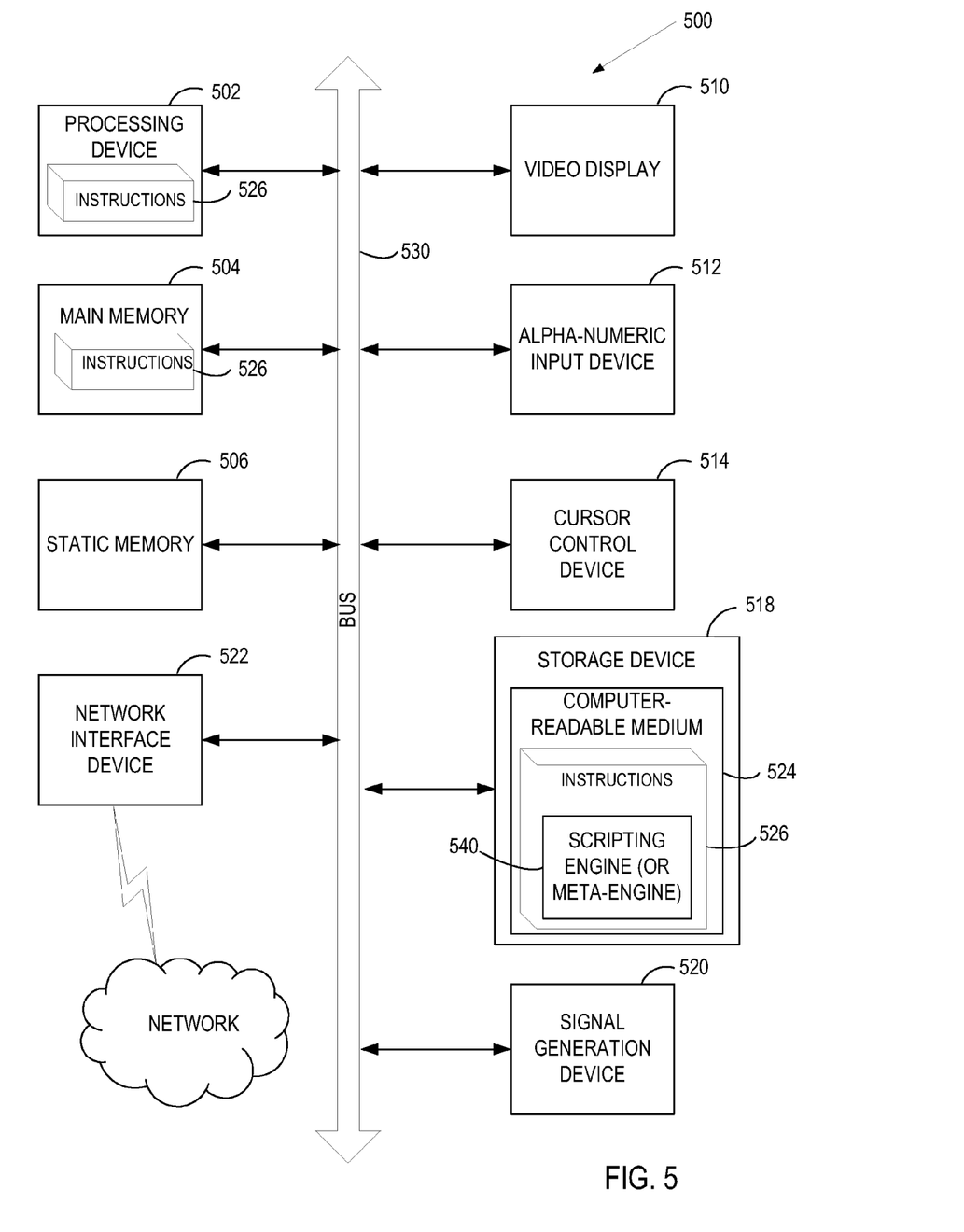
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 embodying any one or more of the methodologies or functions described herein. For example, the instructions 526 may include instructions for a scripting engine and/or scripting meta-engine 540. The instructions 526 may also reside, completely or at least partially, within the main memory 504 and/or within the processing device 502 during execution thereof by the computer system 500, the main memory 504 and the processing device 502 also constituting machine-accessible storage media.

While the computer-readable storage medium 524 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "computer readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "designating", "inserting", "passing", "receiving" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the described method steps. The structure for a variety of these systems will appear from the description above. In addition, the present invention is not described with reference to any particular programming language. It will be appreciated that a variety of programming languages may be used to implement the teachings of the invention as described herein.

What is claimed is:

1. A method comprising:
   providing, by a processing device, a memory structure that represents a data item;
   generating, by the processing device, a pointer to the data item, the pointer having a type;
   generating, by the processing device, a key for the pointer based on the type of the pointer;
   designating a name for the pointer based on the key; and
   inserting the pointer having the designated name into the memory structure, causing the pointer to lose the type.

2. The method of claim 1, wherein the processing device implements a sandbox that provides an isolated execution environment, the method further comprising:
   passing the memory structure into the sandbox;
   receiving, from a first function that runs within the sandbox, the memory structure as an argument for a second function that executes outside of the sandbox;
   generating a new key from an expected type; and
   using the new key to retrieve the pointer having the designated name from the memory structure.

3. The method of claim 2, further comprising:
   in response to determining that the new key matches the designated name, and after retrieving the pointer from the memory structure, adding the type to the pointer.

4. The method of claim 2, wherein using the new key to retrieve the pointer comprises determining a pointer name based on the key and requesting the pointer having the determined pointer name.

5. The method of claim 2, wherein the sandbox is a JavaScript™ sandbox of a JavaScript™ engine and the memory structure is a JavaScript™ object.

6. The method of claim 1, wherein generating the key comprises converting the type of the pointer into a string, and wherein naming the pointer based on the key comprises using the string as the pointer's name.

7. The method of claim 1, wherein the key is generated using a deterministic function.

8. A non-transitory computer readable storage medium including instructions that, when executed by a processing device, cause the processing device to perform operations comprising:
   providing, by the processing device, a memory structure that represents a data item;
   generating, by the processing device, a pointer to the data item, the pointer having a type;
   generating, by the processing device, a key for the pointer based on the type of the pointer;
   designating a name for the pointer based on the key; and
   inserting the pointer having the designated name into the memory structure, causing the pointer to lose the type.

9. The non-transitory computer readable storage medium of claim 8, wherein the processing device implements a sandbox that provides an isolated execution environment, the operations further comprising:
   passing the memory structure into the sandbox;
   receiving a request to perform an operation on the memory structure;
   generating a new key from an expected pointer type; and
   using the new key to retrieve the pointer having the designated name from the memory structure.

10. The non-transitory computer readable storage medium of claim 9, the operations further comprising:
    in response to determining that the new key matches the designated name, and after retrieving the pointer from the memory structure, adding the type to the pointer.

11. The non-transitory computer readable storage medium of claim 9, wherein using the new key to retrieve the pointer comprises determining a pointer name based on the key and requesting the pointer having the determined pointer name.

12. The non-transitory computer readable storage medium of claim 9, wherein the sandbox is a JavaScript™ sandbox of a JavaScript™ engine and the memory structure is a JavaScript™ object.

13. The non-transitory computer readable storage medium of claim 8, wherein generating the key comprises converting the type of the pointer into a string, and wherein naming the pointer based on the key comprises using the string as the pointer's name.

14. The non-transitory computer readable storage medium of claim 8, wherein the key is generated using a deterministic function.

15. A computing apparatus comprising:
    a memory to store instructions for at least one of a scripting engine or a scripting meta-engine; and
    a processing device, coupled to the memory, to execute the instructions, wherein the processing device is to:
      provide a memory structure that represents a data item;
      generate a pointer to the data item, the pointer having a type;
      generate a key for the pointer based on the type of the pointer;
      designate a name for the pointer based on the key; and
      insert the pointer having the designated name into the memory structure, causing the pointer to lose its type.

16. The computing apparatus of claim 15, wherein the processing device is further to:
    implement a sandbox that provides an isolated execution environment;
    pass the memory structure into the sandbox;

receive, from a first function that runs within the sandbox, the memory structure as an argument for a second function that executes outside of the sandbox;
generate a new key from an expected type; and
use the new key to retrieve the pointer having the designated name from the memory structure.

17. The computing apparatus of claim 16, wherein the processing device is further to:
in response to determining that the new key matches the designated name, and after retrieving the pointer from the memory structure, add the type to the pointer.

18. The computing apparatus of claim 16, wherein using the new key to retrieve the pointer comprises determining a pointer name based on the key and requesting the pointer having the determined pointer name.

19. The computing apparatus of claim 16, wherein the sandbox is a JavaScript™ sandbox of a JavaScript™ engine and the memory structure is a JavaScript™ object.

20. The computing apparatus of claim 15, wherein generating the key comprises converting the type of the pointer into a string, and wherein naming the pointer based on the key comprises using the string as the pointer's name.

* * * * *